Aug. 23, 1927. Re. 16,716

S. D. NESMITH

ELECTRIC WATER HEATER

Original Filed Feb. 11, 1924

INVENTOR

Samuel D. Nesmith

BY

Kiddle and Margeson.

ATTORNEYS.

Reissued Aug. 23, 1927. Re. 16,716

UNITED STATES PATENT OFFICE.

SAMUEL D. NESMITH, OF SAN DIEGO, CALIFORNIA, ASSIGNOR OF PART INTEREST TO A. S. BRIDGES, J. B. OSBORN, MRS. KATHRYN OSBORN, J. H. BULMER, AND MRS. MARY E. NESMITH, ALL OF SAN DIEGO, CALIFORNIA; ROGER WELLES AND R. R. RICHARDSON, BOTH OF THE UNITED STATES NAVY; E. J. CALLAHAN, OF GUADALAJARA, MEXICO; GEORGE H. SCHMIDT, WALTER C. STITT, F. F. GRANT, H. M. SAMMIS, PAUL J. HARTLEY, AND R. C. EASOM.

ELECTRIC WATER HEATER.

Original No. 1,574,054, dated February 23, 1926, Serial No. 691,953, filed February 11, 1924. Application for reissue filed May 11, 1926. Serial No. 108,410.

My invention relates to electric water heaters, and the objects of my invention are: First, to provide a heater of this class which is provided with a plurality of flat, vertical, water conducting channels positioned side by side and parallel to each other, which are heated by means of electric heating elements positioned contiguous to and between the adjacent water conducting channels and insulated therefrom and provided with water conductors communicating with the lower and upper ends of all of said water conducting channels, whereby a large volume of water will pass through said channels and be quickly heated therein; second, to provide a heater of this class in which the water resistance is reduced to a minimum and in which a large continuous uninterrupted flow of water passes through said heater and is rapidly heated in its passage therethrough; third, to provide tubes for a heater of this class, the combined thickness of the separate walls of which is approximately equal that of the volume of water passing therethrough; fourth, to provide a substantially instantaneous electric water heater of large proportionate volume and highly efficient; fifth, to provide a water heater of this class in which the water flows into the heater in a horizontal channel in the lower side thereof and quickly passes through a plurality of vertically extending flat water conducting channels to the upper side, where it communicates with a similar connecting channel, from where it is conducted for service; sixth, to provide a water heater of this class in which the water conducting channels are thoroughly insulated from the electric heating elements, thus insuring against the electric current coming in contact with the water; seventh, to provide a novelty constructed water heater of this class, and, eighth, to provide an electric water heater which is very simple and economical of construction, durable, efficient, voluminous in flow, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Like characters of reference refer to similar parts and portions throughout the several views of the drawings.

Figures 1, 2, 3:
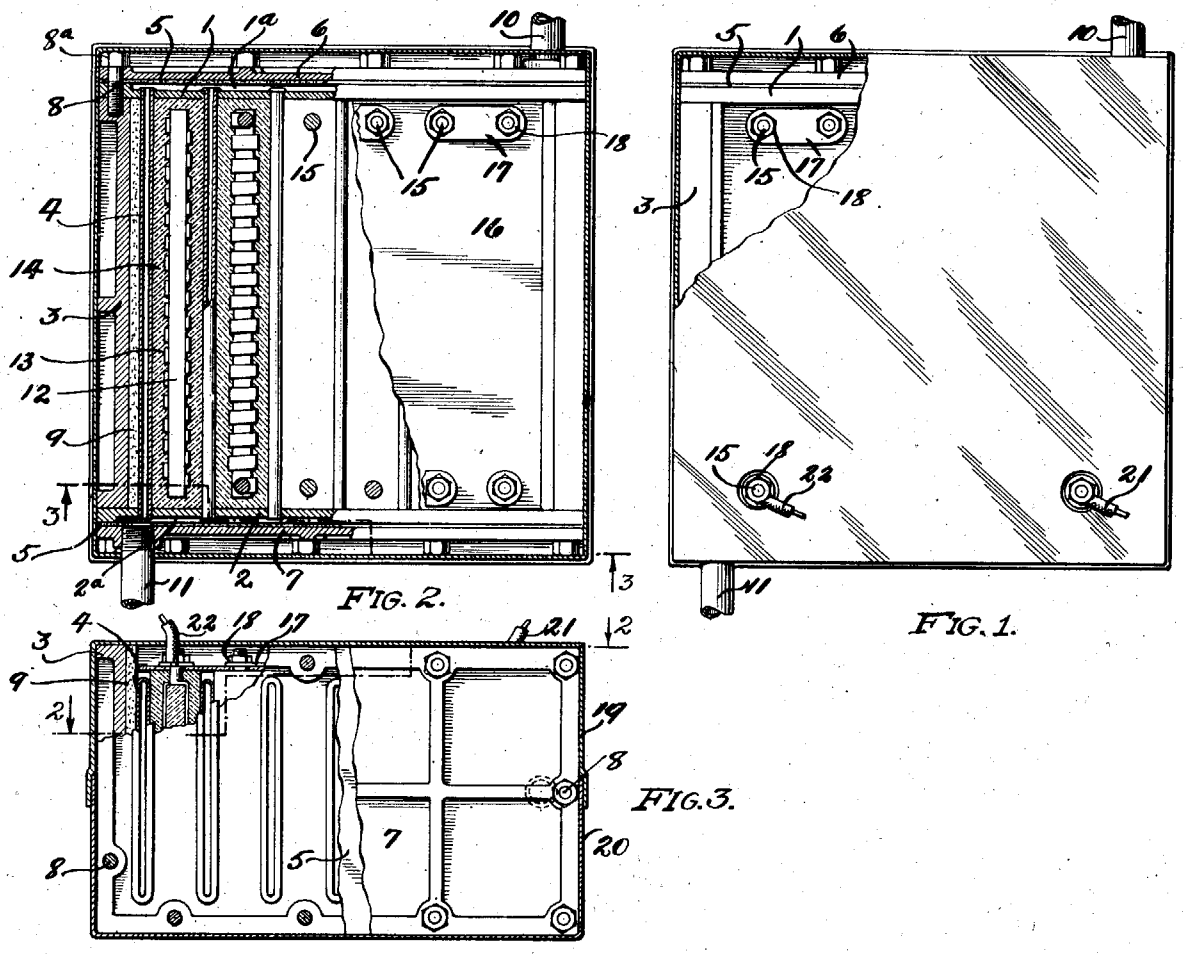
Figure 1 is a front elevational view of my electric water heater with certain parts and portions thereof broken away and in section to facilitate the illustration.
Fig. 2 is a similar view thereof in section with the section taken through 2—2 of Fig. 3.
Fig. 3 is a sectional view thereof taken at right angles to that of Fig. 2 through 3—3 of Fig. 2.

The water tube supporting members 1 and 2, tie members 3, water tubes 4, heat insulating plates 5, top and bottom plates 6 and 7, studs 8, heat insulating material 9, water conductors 10 and 11, cores 12, electric heating elements 13, insulating material 14, terminal posts 15, insulating plates 16, terminal connecting members 17, nuts 18, casing members 19 and 20, and electric conductors 21 and 22, constitute the principal parts and portions of my water heater structure.

The horizontal water tube supporting members 1 and 2 of my water heater are identical in construction, but positioned in reverse order, and are supported in spaced relation with each other at their ends by means of the tie members 3. Extending vertically between the members 1 and 2 are the water tubes 4, extending through said members and welded or riveted over at their projecting ends. These water tubes 4 are preferably made of flattened copper tubing of large diameter or of other material of high heat conductivity, so that a very thin channel for the passage of the water is formed. The outer faces of the members 1 and 2 are provided with channels 1ª and 2ª, which extend horizontally along the top and bottom sides of the heater between the members 1 and 2 and the members 5, thus providing continuous water conducting means, or headers, communicating with the upper and lower ends of the tubes 4 so that water may pass freely from the channel 2ª through the tubes 4 to the channel 1ª, thus providing for rapid continuous flow of water from the lower to the upper side of the heater through the vertical thin water conducting channels or tubes 4. Positioned against the heat insulating plates 5 are the top and bottom plates 6 and 7, which plates are also identical in construction and positioned in reverse order relatively to each other. The top and bottom plates 6 and 7, the heat insulating plates 5 and the members 1 and 2, as well as the members 3, are secured relatively to each other by means of the studs 8 and the nuts 8ª. Between the side water tubes 4 and the tie members 3 is provided heating insulating material 9. Secured in the one end of the upper plate 6 is the water outlet conductor 10 communicating with the channel 1ª at one end; and positioned and secured in the corresponding end of the bottom plate 7 is the water conductor 11, communicating with the water conducting channel 2ª in the opposite lower side of the heater, substantially as shown in Fig. 2 of the drawings.

Each of the electric heating units of my water heater consists of an electric heating element 13 wound around a core 12 of insulating material and molded in a casing 14 of heat conducting and electric insulating material, preferably alundum. The heating units, which are independently removable from the heater, are placed between adjacent tubes, substantially filling these spaces so as to prevent, as far as possible, the formation, to a detrimental degree, of air spaces between the tubes and the units. At the ends of the heating elements 13 are provided the outwardly extending terminal posts 15, which extend through the molded casing 14 and an insulating plate 16, one of which is positioned at the front and another at the back side of the heater. The terminal posts 15 of each unit are connected with the corresponding posts of the adjacent and separately positioned heating elements by means of the connecting members 17 and the nuts 18, as illustrated in the drawings.

The water heater is preferably enclosed by means of a sectional casing consisting of the members 19 and 20. To the front side of the casing member 19 extend the conductors 21 and 22, which conductors are preferably connected with the heating unit positioned at the opposite side of the heater.

It is obvious from this construction, as illustrated in the drawings and disclosed in the foregoing specification, that there is provided an electric water heater as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In an electric water heater, the combination of a plurality of vertically extending open ended flattened water tubes, a supporting channel member at each end of said tubes provided with openings for the passage of water therethrough, said openings lying abreast of the openings in said tubes, a cover plate for said channel members to provide continuous water passageways across the ends of all of said tubes to thereby connect the said tubes in multiple, spacing members interposed between said supporting members, and means for removably attaching the cover plate, supporting members and spacing members to each other to provide a unitary structure.

2. In an electric water heater, the combination of a plurality of open ended flattened water tubes, independently removable electrical heating elements interposed between and located adjacent to said tubes and electrically insulated therefrom, supporting channel members extending across the ends of said tubes, said supporting channel members being provided with openings communicating with the water passageways in said tubes, a cover plate for each of said supporting channel members for sealing the same and providing water passageways across the ends of all of said tubes, whereby said tubes are connected in multiple, and water inlet means opening into one of said water passageways, the lower ends of said tubes and water outlet means opening into the other water passageway at the upper ends of said tubes.

3. In an electric water heater, the combination of horizontally extending tube supporting members, flattened water tubes independently attached to said supporting members, said supporting members being channeled and provided with openings therein to communicate with the water passageways in said tubes, a cover plate for said supporting channel members providing continuous passageways along each end of said tubes to thereby connect said tubes in multiple, spacing members extending between said supporting members at the outer side of the end water tube of said series of tubes, means for removably attaching said cover plates, supporting channel members and said spacing members to each other, heat insulating means between said tubes and said spacing members and cover members removable electrical heating elements located between and adjacent said tubes, and heat conducting electrical insulating means interposed between each of said heating elements and said tubes and encasing the heating elements.

In testimony whereof, I have affixed my signature hereto.

SAMUEL D. NESMITH.